United States Patent [19]

Retka et al.

[11] 4,266,830
[45] May 12, 1981

[54] AUGER CONSTRUCTION PROVIDING REDUCED NOISE

[75] Inventors: Thomas J. Retka, Lakeville; Donald W. Schoen, St. Paul, both of Minn.

[73] Assignee: The United States of America as represented by the Secretary of the Interior, Washington, D.C.

[21] Appl. No.: 817,887

[22] Filed: Jul. 21, 1977

[51] Int. Cl.³ .............................................. E21C 25/10
[52] U.S. Cl. .................................... 299/87; 175/394; 299/90; 173/DIG. 2
[58] Field of Search .................... 299/87, 90; 175/56, 175/394, 409; 64/27 NM; 173/DIG. 2

[56] References Cited

U.S. PATENT DOCUMENTS

| | | | |
|---|---|---|---|
| 2,561,103 | 7/1951 | Fawick | 64/27 NM |
| 2,591,233 | 4/1952 | Browne | 175/394 X |
| 3,003,339 | 10/1961 | Haushalter | 64/27 NM X |
| 3,811,190 | 5/1974 | Sertich | 175/56 X |
| 3,965,992 | 6/1976 | Swisher | 173/DIG. 2 X |
| 4,016,944 | 4/1977 | Wohlfeld | 175/394 X |

*Primary Examiner*—Ernest R. Purser
*Attorney, Agent, or Firm*—Thomas Zack; Donald A. Gardiner

[57] ABSTRACT

An auger construction is provided which reduces the surface noise radiated by the auger and serves to at least partially isolate the auger from the remainder of the machine. The auger construction comprises an inner shaft and outer concentric shafts, the latter carrying the helical cutting blade and generally corresponding to the shaft of a conventional auger. An elongated annulus of noise and vibration dampening material is disposed between the inner and outer shafts. Preferably, the outer shaft is isolated from the machine by further noise dampening material disposed between the mounting flange and the proximate end of that shaft and between the free end of the inner shaft and the end of the hose in the outer shaft. A bore in the inner shaft is also filled with noise dampening material. A number of arrangements are disclosed for fixing the two shafts together so as to prevent rotational slippage therebetween.

5 Claims, 6 Drawing Figures

AUGER CONSTRUCTION PROVIDING REDUCED NOISE

FIELD OF THE INVENTION

The present invention relates to augers used in mining and other applications and, more particularly, to augers which are modified or adapted so as to reduce the noise associated therewith.

BACKGROUND OF THE INVENTION

So-called pick point augers are conventionally used in cutting coal and other material, as well as in moving the material so cut back to the machine so that the material can be conveyed away as desired. In conventional auger constructions, the cutting blade, a helical steel ribbon, is welded to a tubular steel shaft. This shaft is, in turn, welded to a mounting flange and the auger assembly is reinforced by means of steel gussets. The mounting flange of the auger assembly is bolted directly to a mating flange on the associated machine.

During a cutting operation, high level noise is radiated from the auger assembly. Further, vibrations are conducted back to the machine where these vibrations are amplified and radiated to the operators as noise. It will be understood that increasing emphasis has been placed on noise control in recent years and, in this regard, permissible noise levels for coal mining have been set forth in the Coal Mine Health and Safety Act of 1969.

Although some work has been done in the field of noise reduction for auger surface noise radiation, auger constructions which have been designed to solve this problem have proven to be structurally inadequate.

More generally, noise radiation is characteristically a problem in digging, cutting, drilling and like machines and solutions have been proposed to solve this problem. Many of these solutions involve the use of a sleeve or collar fabricated of rubber or other resilient material for dampening or otherwise controlling noise. Examples of such constructions are found in U.S. Pat. Nos. 2,997,024 (McLeon); 3,842,942 (Jensen et al); 3,848,931 (Swisher) and 3,926,265 (Bouyoucos). Briefly considering these patents, the McLeon patent discloses a rock drill collar in the form of an inner rubber annulus or sleeve and an outer metal sleeve. The Jensen et al patent discloses a "constrained layer damper and noise suppressor" for a rock drill steel shaft which includes a dampening medium located within a constraint tube. The Swisher patent discloses a drill bit designed to provide vibration attenuation and including a dampening collar comprising a compressible sleeve. The Bouyoucos patent discloses a drill string for a percussive drilling device which includes a resilient member or members used in reducing the level of noise.

SUMMARY OF THE INVENTION

In accordance with the invention, an auger construction is provided which substantially reduces the noise and vibration associated with the auger. In general, this is accomplished by isolating the auger from the remainder of the mining machine itself and by reducing the surface radiation of the auger.

According to a preferred embodiment thereof, the auger construction of the invention includes inner and outer concentric shafts, the outer shaft being provided with a helical cutting blade and generally corresponding to that found in conventional augers. The inner shaft is connected to, or formed integral with, the mounting flange and a tubular annulus of noise and vibration dampening material, e.g., rubber, is located between the two shafts. Preferably, the inner shaft is tubular and includes further noise and vibration dampening material disposed in the bore therein. Advantageously, the outer shaft is isolated from the mounting frame by means including a ring of dampening material disposed between the end of the outer shaft which is proximate to the machine and the mounting flange itself and a disc of dampening material located at the free end of the inner shaft. In another embodiment, metal gussets are used to connect the mounting flange to the outer shaft to improve the structural integrity of the auger assembly.

The inner and outer shafts are connected together to prevent rotational slippage, this connection preferably being effected by one or more elongate securing members which extend through at least one wall of both the outer and inner shafts. The securing member is isolated from at least the outer shaft by an isolating sleeve or grommet. Several embodiments of the securing means are discussed hereinafter.

Other features and advantages of the invention will be set forth in, or apparent from, the detailed description of a preferred embodiment found hereinbelow.

DESCRIPTION OF THE PREFERRED EMBODIMENTS

Figure 1:
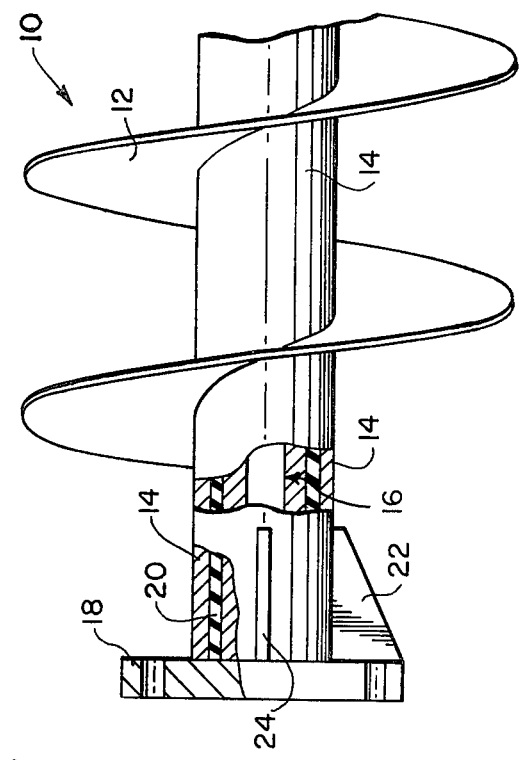
FIG. 1 is a side elevational view, partially in section, of a first embodiment of an auger constructed in accordance with the present invention.

Referring to FIG. 1, a first embodiment of an auger modified in accordance with the invention is shown. The auger, which is generally denoted 10, includes a helical steel ribbon 12 fixedly secured, preferably by welding, to an outer tubular shaft 14. An inner tubular shaft 16 is welded to a mounting flange 18 which is adapted to be bolted directly to a mating flange (not shown) on the machine which drives the auger. Shaft 14 corresponds to the existing shaft in conventional augers and would normally be directly secured to flange 18. Shafts 14 and 16 are connected together by suitable means, such as discussed hereinbelow with reference to FIGS. 3(a) to 3(d), so that they rotate as an unit. A vibration dampening annulus 20, constructed of rubber or the like, is disposed between the shafts 14 and 16 and vulcanized in place. In the embodiment of FIG. 1, gussets, indicated at 22 and 24, are welded between the outer shaft 14 and the mounting flange 18, as illustrated. It has been found that this construction provides the same structural integrity as a conventional auger with very little sacrifice in the dampening effect.

Figure 2:
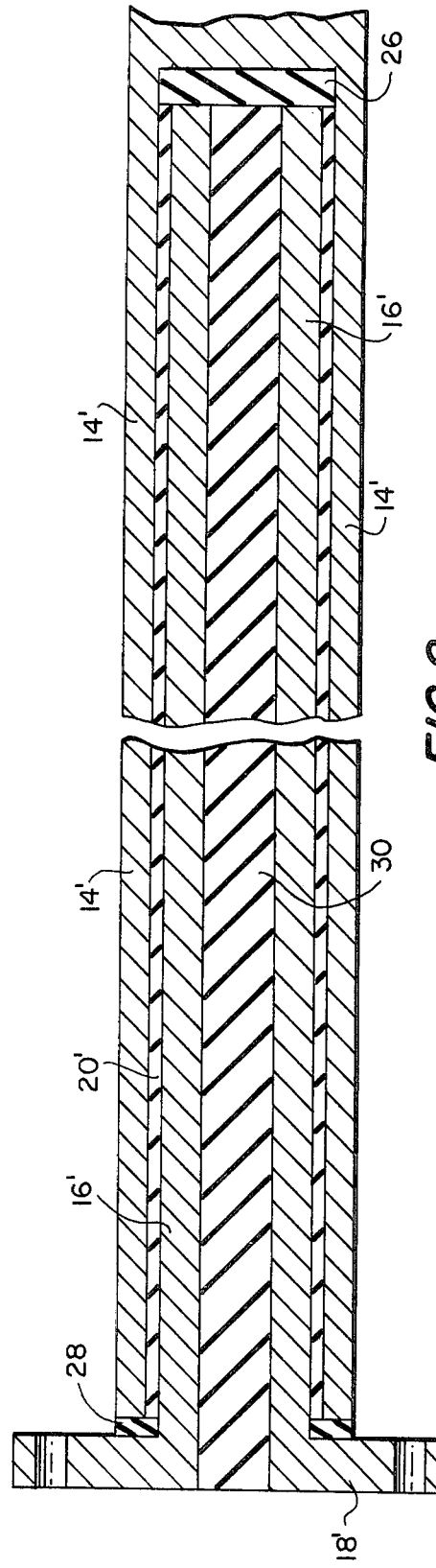
FIG. 2 is a longitudinal cross-sectional view of a second embodiment of the invention.

Referring to FIG. 2, a second embodiment of the invention is shown. This embodiment is quite similar to that of FIG. 1 and like elements have been given the same reference numerals as in FIG. 1 but with primes attached. Inner shaft 16' is formed integrally with mounting flange 18' and is received in a longitudinal bore in outer shaft 14'. In addition to rubber annulus 20', further dampening material, in the form of a disc indicated at 26, is disposed between the free end of inner shaft 16' and the end of the bore in outer shaft 14'. Further, additional dampening material, in the form of a further annulus indicated at 28, is disposed between the proximate end of outer shaft 14' and the facing portion of mounting flange 18'. Finally, an internal bore in inner shaft 16' is also filled with a dampening material, indicated at 30. Like annulus 20', the additional dampening material is preferably fabricated of rubber. Dampening material 26, 28 and 30 aids in isolating the outer shaft 14' and the helical cutting blade carried thereby (not shown but corresponding to blade 12 of FIG. 1) from the machine which drives the auger.

Figures 3A, 3B, 3C, 3D:
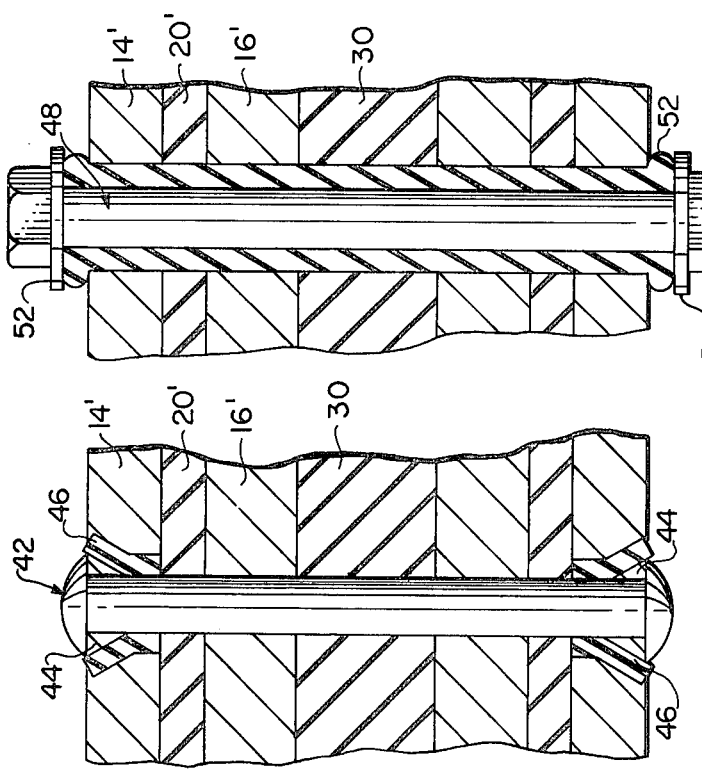
FIGS. 3(a) to 3(d) are cross-sectional views of four different embodiments of an arrangement for securing together the inner and outer shafts of the auger of the invention to prevent rotation therebetween.

Referring to FIGS. 3(a) to 3(d), there are illustrated four different arrangements for affixing the outer shaft of the auger to the inner shaft thereof so as to prevent rotational slippage. Although reference numerals corresponding to those in FIG. 2 are used in these figures, it will be self-evident that these arrangements are applicable to both embodiments described hereinbefore. In FIG. 3(a), a screw connection is provided, a screw 32 extending through outer shaft 14' and inner shaft 16'. An insulating grommet 32 provides further isolation. A flat washer 34 is captured between grommet 32 and a hexagonal screw cap 36. In FIG. 3(b), a dowel pin 38 is press fit into the inner shaft 16' and an insulator sleeve 40 is also used. In FIG. 3(c), a through rivet 42 is used in combination with a special washer 44 and a pair of isolator sleeves 46. In FIG. 3(d), a through bolt 48 is used together with a flat washer 50 and an isolator sleeve 52 which extends the length of bolt 48.

It is noted that the modified augers of the invention have proved to be quite successful in practice both from a standpoint of structural integrity and with respect to noise reduction. Acoustical testing has demonstrated that the radiated noise from the auger surface is reduced by 3 to 6 dB.

Although the invention has been described relative to exemplary embodiments thereof, it will be understood that other variations and modifications can be effected in these embodiments without departing from the scope and spirit of the invention.

We claim:

1. In an auger for use in mining and like applications and comprising a rotatable helical cutting blade secured to an outer shaft, and a mounting flange for connecting the auger to a drive therefor, the improvement comprising:
   an inner shaft disposed within a longitudinal bore in the outer shaft concentric therewith and connected to the mounting flange, said inner and outer shafts being spaced from each other along their longitudinal extents;
   a plurality of gussets for connecting the mounting flange to the outer shaft; and
   a tubular annulus of a solid noise dampening material located in the space between said shafts and extending substantially the entire length of said inner and outer shafts.

2. In an auger for use in mining and like applications and comprising a rotatable helical cutting blade secured to an outer shaft, and a mounting flange for connecting the auger to a drive therefor, the improvement comprising:
   an inner tubular shaft with a longitudinal bore therein, said inner shaft being disposed within a longitudinal bore in the outer shaft concentric therewith and connected to the mounting flange, said inner and outer shafts being spaced from each other along their longitudinal extents, said outer shaft being unconnected to said mounting flange an means being provided to connect said outer and inner shafts to each other; and
   a tubular annulus of a solid noise dampening material located in the space between said shafts and extending substantially the entire length of said inner shaft, and additional solid noise dampening material being disposed in the bore of the inner shaft.

3. An auger as claimed in claim 2 further comprising a solid ring of noise dampening material disposed between the outer shaft and the mounting flange for isolating the outer shaft from the drive for said auger.

4. An auger as claimed in claim 3 further comprising an additional disc of solid noise dampening material disposed between the free end of said inner shaft and the end of the bore in the outer shaft.

5. In an auger for use in mining and like applications and comprising a rotatable helical cutting blade secured to an outer shaft, and a mounting flange for connecting the auger to a drive therefor, the improvement comprising:
   an inner shaft disposed within a longitudinal bore in the outer shaft concentric therewith and connected to the mounting flange, said inner and outer shafts being spaced from each other along their longitudinal extends;
   a tubular annulus of a solid noise dampening material located in the space between said shafts and extending substantially the entire length of said inner shaft; and
   a further solid noise dampening material disposed between the outer shaft and the mounting flange for isolating the outer shaft from the drive therefor.

* * * * *